United States Patent

McGuire, III

[11] Patent Number: 5,418,034
[45] Date of Patent: May 23, 1995

[54] MULTIPLE PLY COMPOSITE VENEER LAMINATE WITH IMPROVED DIMENSIONAL STABILITY

[75] Inventor: Charles B. McGuire, III, Louisville, Ky.

[73] Assignee: Formwood Industries, Inc., Jeffersonville, Ind.

[21] Appl. No.: 954,751

[22] Filed: Sep. 30, 1992

[51] Int. Cl.⁶ .............................................. B32B 5/12
[52] U.S. Cl. ................................. 428/106; 144/329; 144/332; 428/113; 428/114; 428/212; 428/213; 428/534; 428/535
[58] Field of Search .............. 428/105, 106, 107, 109, 428/110, 114, 212, 213, 530, 534, 520, 529, 535, 537.1, 537.5, 98; 144/329, 332

[56] References Cited

U.S. PATENT DOCUMENTS

| | | | |
|---|---|---|---|
| 1,314,519 | 9/1919 | Howard | 428/106 |
| 1,387,001 | 8/1921 | Fisher | 337/253 |
| 1,412,510 | 4/1922 | Christmas | 428/106 |
| 2,220,898 | 11/1940 | Franklin | 428/106 |
| 2,356,625 | 8/1944 | Schuman | 428/106 |
| 3,677,884 | 7/1972 | Bornstein | 428/531 |
| 3,969,558 | 7/1976 | Sadashige | 428/58 |
| 4,047,344 | 9/1077 | Postman | 428/106 |
| 4,204,420 | 5/1980 | Rogers et al. | 72/439 |
| 4,552,792 | 11/1985 | Julian et al. | 428/40 |
| 4,569,873 | 2/1986 | Robbins | 428/106 |
| 4,569,873 | 2/1986 | Robbins | 428/106 |
| 4,652,477 | 3/1987 | Rindfleisch et al. | 428/40 |

Primary Examiner—Nasser Ahmad
Attorney, Agent, or Firm—Camoriano & Smith

[57] ABSTRACT

The present invention is a veneer laminate comprising a first veneer sheet as one surface, a second veneer sheet as the other surface of the laminate with its grain running substantially parallel to the grain of the first sheet, and a sheet of paper of a width of substantially the same width as the first and second veneer sheets bonded to the inner surface of each of the veneer sheets. The fibers of the veneer sheets in a direction substantially normal to the grain of said veneer sheets are broken at spaced intervals sufficient to permit the flexing of the laminate about a tight radius of an object of less than about 90°.

4 Claims, 2 Drawing Sheets

MULTIPLE PLY COMPOSITE VENEER LAMINATE WITH IMPROVED DIMENSIONAL STABILITY

FIELD OF THE INVENTION

The invention relates to wood panels and, more particularly, to multiple ply wood veneer laminates adapted to be used to cover furniture and the like.

BACKGROUND OF THE INVENTION

Wood veneer is highly desirable for many purposes including the covering of furniture with wood of appropriate grain and coloring. Because the veneer sheets are thin, difficult to handle without breakage, subject to warping and delamination when adhered due to environmental considerations, it is desirable to give the sheet stability by bonding the sheets to a substrate. Composite veneer laminates, i.e., veneer sheets bonded to a substrate, come in many forms such as paper backed veneer laminates in which the veneer sheet is glued directly to a paper substrate. The paper itself can have varying thicknesses as desired. Another common laminate is a fabric backed veneer laminate in which the veneer sheet is glued to a fabric of selected stiffness. An early composite laminate is found in U.S. Pat. No. 1,387,101 in which the veneer sheet is adhered to a box board paper intermediate layer and wire mesh reinforcement. An example of a wood to wood composite laminate is found in U.S. Pat. No. 2,356,625 that describes two sheets of veneer being bonded together with a matrix of saw dust and adhesive. Notably the sheets in this patent have their grains running in parallel directions. To provide stability to the composite, strips of veneer with the grains running perpendicular to the grain of the sheets were adhered thereto.

An important improvement to the aforementioned laminate is described in U.S. Pat. No. 4,569,873 describing a composite laminate in which three veneer sheets are used. Two of the sheets are the face plies of the composite laminate while the third sheet is the center ply. The grains of the outer plies run in parallel directions. An adhesive is used to bond the three sheets. To provide structural integrity the center sheet has the grain running perpendicular to the grain of the outer face plies.

Still another type of composite laminate is the phenolic backed veneer sheet which has found great acceptance in the industry. In this case the integrity of the sheet is maintained by supplying a thick paper sheet impregnated with glue. The laminate is then adhered to a surface gluing the phenolic backing directly the article being covered. Phenolic backed laminates are characterized by durability but not flexibility and dimensional stability.

One problem with the composite laminates discussed above and others in the prior art is maintaining the appropriate balance between durability and flexibility. When fabricating composite laminates in an attempt to gain durability and dimensional stability under various atmospheric conditions, the result is generally a stiff laminate that is rigid. It is extremely difficult to post the laminate around articles to be covered without damaging the laminate itself. It is generally necessary to cut the laminate when reaching the edge of a corner and to start again with another piece of the laminate around the corner. The internal composition of the laminate will be readily apparent and be manifested in the form of a black line. To obscure or otherwise camouflage the black line, artisans often use moldings and the like that may not be suitable in many applications. Yet the additional wood ply or phenolic resin backing is required to provide the aforementioned stability and/or durability.

It is therefore a paramount object of the present invention to provide for a new composite veneer laminate made substantially of wood having good stability and durability which can be bent around tight radii of the structure to be covered and additionally does not display the dark line evidenced by prior art composite laminates even when cut and the edge thereof is exposed.

It is still another important object of the present invention to provide a method for making composite veneer laminates having improved stability, durability and flexibility and which minimize the visibility of internal construction of the laminate when viewed on edge.

SUMMARY OF THE INVENTION

In accordance with one embodiment of the present invention, a composite veneer laminate comprises a pair of veneer sheets as the outward facing surfaces of the laminate and a sheet of paper sandwiched therebetween, the paper sheet having a thickness of not greater than about 5 mils. The veneer sheets are bonded to the paper sheet by an appropriate adhesive. Additionally, the veneer sheets are positioned so that the grains are running parallel with one another. The fibers of the veneer sheets lying across the grain are broken at predetermined intervals so as to provide further flexibility across the grain of the veneer sheets and permit posting of the veneer about tight radius applications such as the corners of furniture, profiles of molding and the like.

In accordance with another embodiment of the present invention, a process for making a composite veneer laminate comprises supporting a first sheet of veneer in a substantially horizontal position, laying a sheet of paper having adhesive on both sides thereof on the first sheet of veneer, laying a second sheet of veneer on the paper sheet with the grain thereof running substantially parallel to the grain of the first veneer sheet, applying a predetermined amount of pressure to the laminate and simultaneously heating the laminate at predetermined temperature for a time period sufficient to cause the veneer sheets to bond to the paper sheet lying across the grain, and thereafter breaking the fibers of the veneer sheets of the composite laminate at predetermined intervals.

Still other objects of the present invention will become readily apparent to those skilled in the art from the following description wherein there is shown and described a preferred embodiment of this invention. As it will be realized, the invention is capable of being modified in various, obvious aspects all without departing from the invention. Accordingly the drawings and descriptions will be regarded as illustrative in nature and not as restrictive.

Reference will now be made in detail to the present preferred embodiment of the invention, an example of which is illustrated in the accompanying drawing.

DETAILED DESCRIPTION OF THE PREFERRED EMBODIMENT

Figure 1:
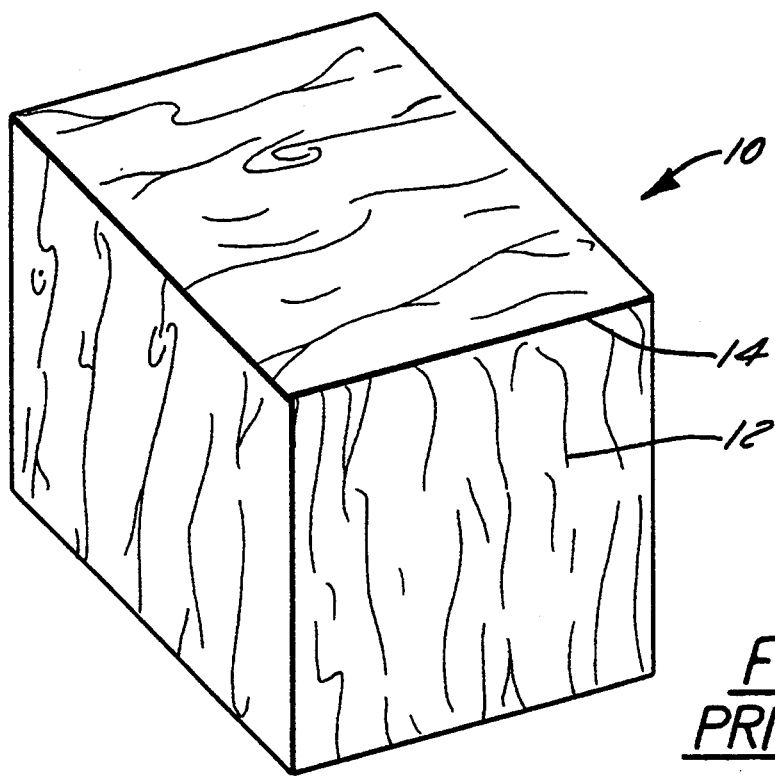
FIG. 1 is a perspective illustrative taken from an actual photograph of a cubic structure covered by a phenolic backed veneer laminate typical of the prior art.

Reference is made to FIG. 1 which illustrates a cubic structure 10 covered by a phenolic backed veneer laminate 12 typical of the veneer laminates used extensively today. Because the laminate has a relative thick backing made of paper and a phenolic based glue penetrating the paper, the sectional view shown along the edges of cubic structure easily displays the characteristic black line denoted by the character numeral 14 of this type of laminate. These type of laminates lack the ability to "post" (flex about a tight radius) around corners. Thus, it is necessary to cut the laminate to fit along the edge and start anew on the adjacent perpendicular surface. The side of the laminate is therefore exposed and the backing is clearly visible as a line. Multiple veneer laminates using a central wood veneer ply with cross grain positioning also would show the internal structure when cut along the edges.

To camouflage the line those skilled in the art often use molding or other materials to hide the line. However, many applications cannot use such techniques or the structure of the object to be covered requires veneer sheet to be tailored such that the edges thereof are exposed. Thus, the line, undesirable as it may be, remains exposed. Typical prior art paper backed laminates, while not having the disadvantage of a highly visible black line, lack the structural integrity to withstand continuous moisture exposure and handling, often resulting in warping of the material or delamination in situ.

Figure 2:
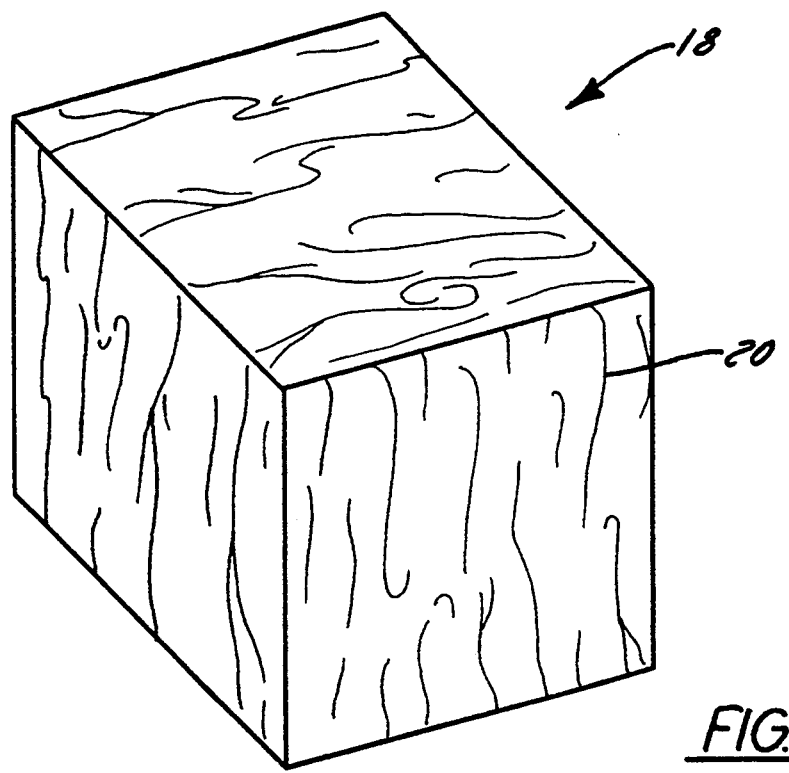
FIG. 2 is a perspective illustration taken from an actual photograph of an identical cubic structure of FIG. 1 covered by a composite veneer laminate in accordance with the present invention.

The cubic structure 18 of FIG. 2 is identical in all respects to that of FIG. 1 except for the sheets of composite veneer laminate 20 covering the surface of the structure. It is important to note that even where the edges of the veneer laminate are exposed no discernible line is evident. As will be discussed below, since the width of the paper sheet bonding the veneer sheets together is relative small, the edge thereof is almost invisible. Essentially the composite laminate is almost completely composed of wood and has both good flexibility and dimensional stability as discussed below. Thus, the composite laminate of the present invention allows one to produce unbroken corner edges without resorting to the camouflaging techniques of the prior art even when the edge is exposed. In many instances because of the excellent flexibility characteristics of the composite laminate of the present invention, the laminate can be posted around a tight radius and there is not need to cut or otherwise have a discontinuous laminate surface in situ.

Figure 3:
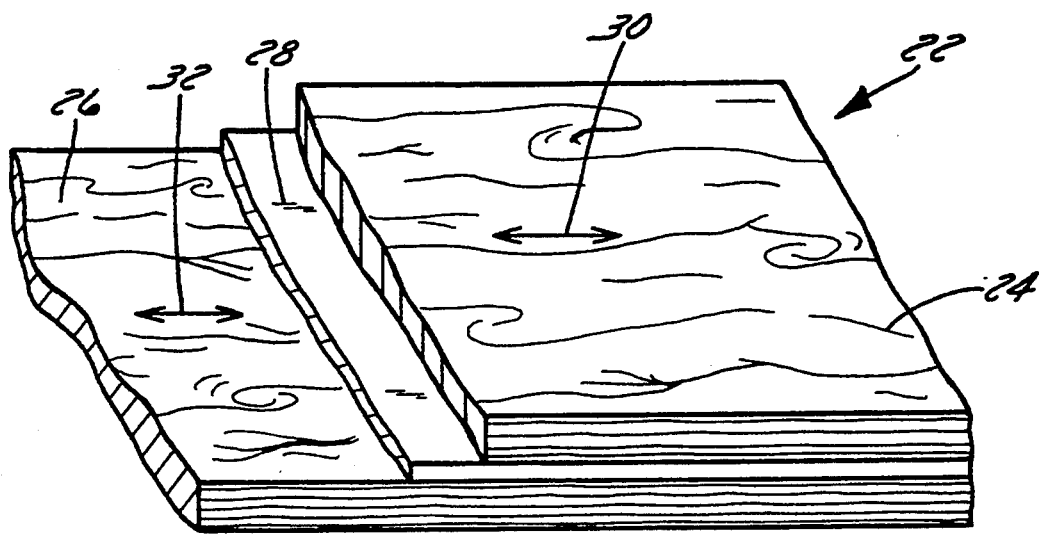
FIG. 3 is a perspective view of a composite veneer laminate in accordance with the present invention with portions of the top plies broken away to show the internal structure thereof.

A composite laminate 22 in accordance with the present invention is illustrated in FIG. 3. For clarity, the thicknesses of the various plies are exaggerated and are not to scale. Laminate 22 comprises generally two layers of veneer sheets 24, 26 bonded together by flexible paper sheet 28 having adhesive on both sides thereof.

As can be seen in FIG. 3, sheet 28 has substantially the same width of veneer sheets 24, 26. The sheets 24 and 26 are positioned such that the grains run in parallel directions as indicated by the directional arrows 30 and 32. Finally, the entire laminate is "tenderized" by breaking the fibers lying across the grain of the veneer sheets at predetermined intervals allowing significantly improved flexibility across the grain.

Composite laminates of the present invention may be constructed from a large number of species of wood, available domestically or abroad, such as birch, elm, sugar maple, ash, red, white and pin oak, mahogany and teak. The thickness of the veneer sheets used in the composite of the present invention varies depending upon the application but is generally between about 0.036 inches (0.09 centimeters) and 0.02 inches (0.051 centimeters).

The paper used as the central ply is a thermoset paper, double coated with adhesive, having a thickness of between about 0.005 inches (0.013 centimeters) to 0.015 inches (0.038 centimeters), preferably about 0.01 inches (0.025 centimeters). Such thermoset paper is commonly available and may, for example, be purchased from Kimberly Clark as paper number C64233.

To provide flexibility suitable for posting and the like, the fibers are broken at intervals of between about 0.125 inches (0.31 centimeters) and 0.06 inches (0.16 centimeters). The breaking of the fibers lying across the grain of the veneer sheets allows the laminate of the present invention to be flexed across the grain when the composite is wrapped in a small radius, i.e., around a corner or an angle of 90° or less. It additionally promotes durability as the composite will not tend to delaminate or warp over a period of time due to atmospheric conditions. When exposed to moist air the cells of the wood tend to swell due to moisture penetration and the fibers attempt to bend back into original position. Breaking the fibers adds dimensional stability to the composite, thus minimizes warping and delamination from the surface of the object covered by the composite laminate.

Figure 4:
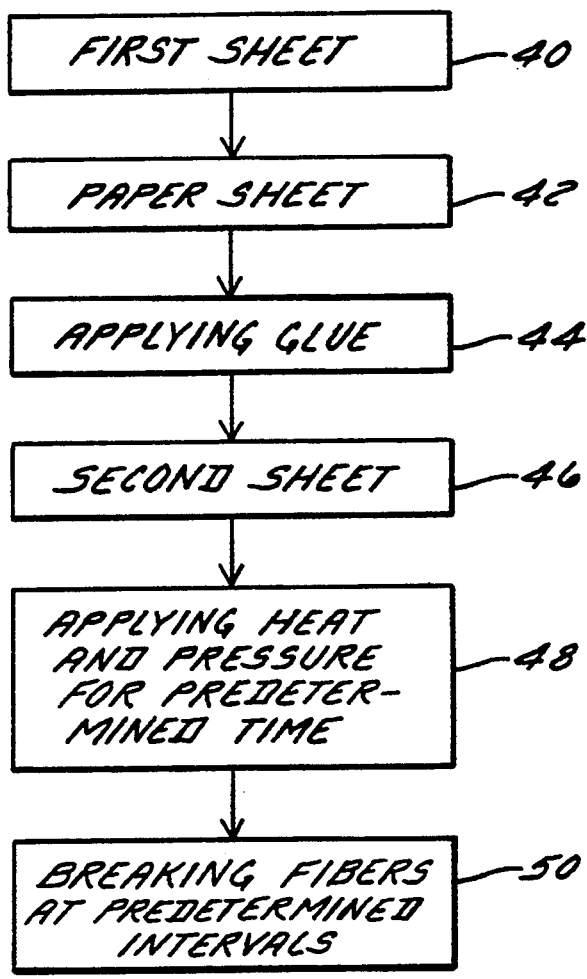
FIG. 4 is a flow diagram of a process for making a composite veneer laminate in accordance with another embodiment of the present invention.

The laminate of the present invention can be fabricated in accordance with the steps set forth in outline form in FIG. 4. The first step 40 comprises the positioning of a sheet of selected wood and thickness such as, for example, a sheet of ash veneer of about 1/28th of an inch on a horizontal support. Step 42 is the placement of a sheet of thermoset paper having a thickness, for example, of about 5 mils and coated with an adhesive on at least the side to abut the first veneer sheet. The adhesive should be a thermosetting type of adhesive as discussed above. The sheet then may be coated on the up-face as shown in step 44 with the adhesive to accept the second veneer sheet. Alternatively, the paper sheet may be precoated with adhesive on both sides before placing on the first veneer sheet as desired.

Step 46 is the positioning of the second veneer sheet over the paper sheet. Preferably the second sheet is of the same species and thickness as the first sheet to promote dimensional stability. However, there may be instances when it is appropriate to use sheets of different species and thicknesses. The grain of the second sheet is positioned parallel to the grain of the first sheet. In the next step 48, the intermediate composite laminate is next subjected to pressure and heat for a predetermined time period until the adhesive is completely bonded to the veneer sheets. The pressure and temperature needed to accomplish bonding varies depending mainly upon the type of wood composing the veneer sheets, the paper and the adhesive employed. However, typical pressures are between about 100 to 120 psi, preferably about 110 psi, and the temperatures range from about 280° F. to 340° F., preferably about 310° F. The time duration for applying pressure and heat at any of the temperatures and pressures is generally short, depending on the nature of the constituent parts of the laminate. Typical time periods are between about one to ten minutes, and preferably about two minutes when using the example thickness and species above at the preferred pressure and temperature. The pressure and temperature can be supplied by a hot hydraulic press. For efficient manufacture of the composite laminates, the laminates may be stacked in sheets as high as eight when applying the pressure and heat.

The final step 50 involves the breaking of the fibers in the laminate across the grain at predetermined intervals. This step can be accomplished by causing the laminate composite to move around a tight radius such as a roller under pressure to ensure the sheet follows the curvature. The sheet should be moved in a direction substantially perpendicular to the direction of the grain. It has been found that the breaking should occur at about 0.06 inches (0.16 centimeters) to 0.125 inches (0.32 centimeters) for the best flexibility performance. To accomplish appropriate breakage, the roller about which the composite laminate is moved should have a radius of between about 0.250 to 0.125 inches. To prevent damage to the wood veneer the roller may be covered with a rubber or elastomeric covering.

The foregoing description of a preferred embodiment of the invention has been presented for purposes of illustration and description. It is not intended to be exhaustive or limiting with respect to the precise form disclosed. Obvious modifications or variations are possible in light of the above teachings. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

I claim:

1. A veneer laminate comprising
    (a) a first veneer sheet as one surface;
    (b) a second veneer sheet as a second surface of said laminate, said second sheet having its grain running substantially parallel to the grain of said first sheet, said first and second sheets having a thickness of between about 0.036 and 0.02 inches; and
    (c) a sheet of paper having a thickness of between about 0.005 and 0.015 inches and a width of substantially the same width as said first and second veneer sheets, said paper sheet being bonded to an inner surface of each of said veneer sheets, said veneer sheets, said inner surface of each of said veneer sheets faces each other having fibers which lie in a direction substantially normal to the grain of said veneer sheets and are broken at spaced intervals sufficient to permit the flexing of said laminate about a tight radius of an object of less than about 90°.

2. The veneer laminate of claim 1 in which said intervals are between about 0.125 inches and 0.06 inches.

3. The laminate of claim 1 in which said sheet of paper is coated on both sides with an adhesive.

4. The laminate of claim 3 in which said adhesive is a thermosetting adhesive.

* * * * *

UNITED STATES PATENT AND TRADEMARK OFFICE
CERTIFICATE OF CORRECTION

PATENT NO. : 5,418,034
DATED : May 23, 1995
INVENTOR(S) : McGuire

It is certified that error appears in the above-identified patent and that said Letters Patent is hereby corrected as shown below:

Column 6, lines 22-23, after "inner surface of each said veneer sheets," delete "said veneer sheets,".

Column 6, line 25, after "other" should read-- said veneer sheets, --.

Signed and Sealed this

Seventh Day of April, 1998

Attest:

BRUCE LEHMAN

*Attesting Officer*     *Commissioner of Patents and Trademarks*